United States Patent [19]
Lecznar et al.

[11] Patent Number: 5,990,574
[45] Date of Patent: *Nov. 23, 1999

[54] INTEGRATED STEERING SYSTEM

[75] Inventors: Mark T. Lecznar, Grosse Point Woods; LaVerne R. Newman, Southfield, both of Mich.; Michael J. Tscherne, Toledo, Ohio; Jeffrey A. Branch, Eastpoint; Gary J. Kopacz, Dearborn Heights, both of Mich.

[73] Assignee: Lear Automotive Dearborn, Inc., Southfield, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/771,069

[22] Filed: Dec. 20, 1996

[51] Int. Cl.$^6$ ............................................. B60R 25/04
[52] U.S. Cl. ................................... 307/10.5; 180/287
[58] Field of Search ................... 307/10.1–10.6, 307/10.8; 200/61.27, 61.3, 61.54; 180/287; 70/413, DIG. 51, 237, 252; 439/15, 164; 340/825.69, 825.72, 425.5, 426, 825.3–825.32

[56] References Cited

U.S. PATENT DOCUMENTS

| | | | |
|---|---|---|---|
| 4,616,224 | 10/1986 | Reighard | 340/825.69 |
| 4,749,823 | 6/1988 | Mutoh et al. | 307/10.2 |
| 5,023,605 | 6/1991 | McColl | 307/10.5 |
| 5,197,315 | 3/1993 | Zagoroff | 70/237 |
| 5,382,988 | 1/1995 | Richmond | 180/287 |

Primary Examiner—Richard T. Elms
Attorney, Agent, or Firm—Niro, Scavone, Haller & Niro

[57] ABSTRACT

The present invention teaches an integrated steering system for use with a directional control system and an electronic control system for controlling an engine and a first and a second feature. The integrated steering system comprises an integrated ignition system and a multifunction switch. The integrated ignition system comprises a lock having a key, an ignition, and a microcomputer for coupling the ignition with the electronic control system if the lock is enabled by the key, and for preventing the ignition from being coupled with the electronic control system if the lock is disabled by the key. Moreover, the multifunction switch is coupled with the microcomputer for enabling and disabling the first and second features such that the microcomputer controls the first and second features in response to the multifunction switch.

28 Claims, 2 Drawing Sheets

INTEGRATED STEERING SYSTEM

TECHNICAL FIELD OF THE INVENTION

The present invention relates to vehicles, generally, and more particularly, to an integrated steering system.

BACKGROUND OF THE INVENTION

Steering systems are known within the automotive industry. Traditionally, steering systems comprise a number of independent components. Each component of this known design must be assembled together to form the system itself.

Referring to FIG. 1, a known configuration of a steering system 10 is illustrated. System 10 comprises a lock cylinder 55 having a key 60 for enabling and disabling an ignition switch 45 through wires 50. To provide a degree of security, system 10 also comprises a solenoid based steering lock. However, as a means of insuring against theft, lock cylinder 55, ignition switch 45 and solenoid 40 are assembled within a housing which is die cast with a heavy material, such as zinc for example. By this arrangement, a large force is required to pull out lock cylinder 55 from a lock cylinder housing (not shown), to enable ignition switch 45 and disable the solenoid steering lock 40 and "hot wire" the ignition.

Moreover, system 10 comprises a multifunction switching system 30. Multifunction switch system 30 provides switch control to enable and disable independently at least two functional features such as the windshield wiper speed, turn signals, dimmer, hazard lights, parking lights, and brights. To achieve this end, multifunction switch system 30 interfaces with either an internal electronic module or externally electronic control unit.

Lock cylinder 55, ignition switch 45, solenoid 40, and multifunction switch system 30 are all configured within, without, as well as proximate to a steering column 34. Column 35 is further coupled with a clockspring 25 for for transmitting power and signal information of the steering system. To realize this feature, clockspring 25 is mechanically coupled with a steering wheel 15 having an airbag 20, while also being electrically coupled with an electronic control unit.

Several shortcoming are apparent to this know configuration. These include limited security, complexity of assembly, and expense with respect to components and their manufacture, for example. In view of these problems, a need remains for a steering system having improved security, that is simple to assemble and reduces the overall cost of the product.

SUMMARY OF THE INVENTION

The primary advantage of the present invention is to overcome the limitations of the prior art.

In order to achieve the advantages of the present invention, an integrated steering system is disclosed for use with a directional control system and an electronic control system for controlling an engine and a first and a second feature. The integrated steering system comprises an integrated ignition system and a multifunction switch. The integrated ignition system comprises a lock having a key, an ignition, and a microcomputer for coupling the ignition with the electronic control system if the lock is enabled by the key, and for preventing the ignition from being coupled with the electronic control system if the lock is disabled by the key. Moreover, the multifunction switch is coupled with the microcomputer for enabling and disabling the first and second features such that the microcomputer controls the first and second features in response to the multifunction switch.

These and other objects, features and advantages of the present invention will become more apparent in light of the following detailed description of an exemplary embodiment thereof as illustrated in the accompanying drawings.

BRIEF DESCRIPTION OF THE DRAWINGS

The present invention will be better understood from reading the following description of non-limitative embodiments, with reference to the attached drawings, wherein below.

It should be emphasized that the drawings of the instant application are not to scale but are merely schematic representations and are not intended to portray the specific parameters or the structural details of the invention, which can be determined by one of skill in the art by examination of the information herein.

DETAILED DESCRIPTION OF THE PREFERRED EMBODIMENTS

Figure 2:
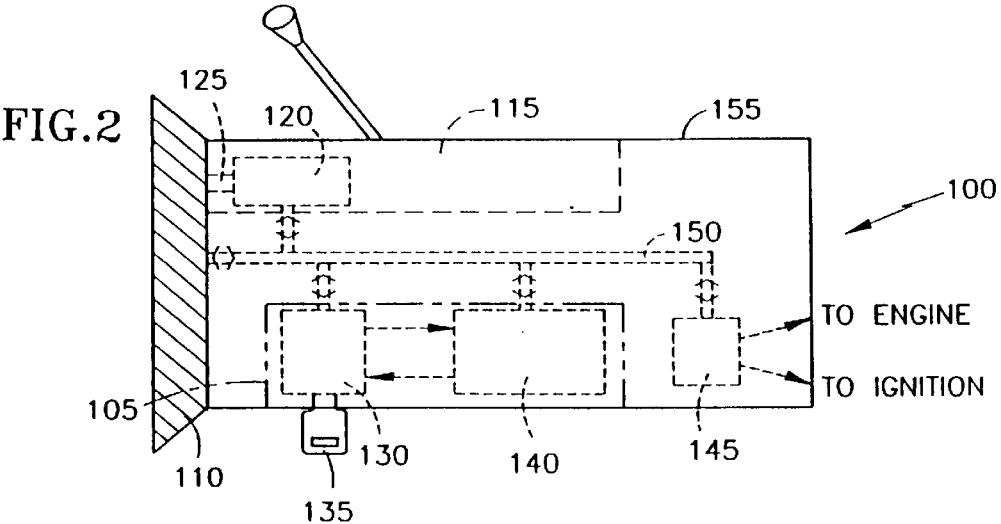
FIG. 2 illustrates the preferred embodiment of the present invention.

Referring to FIG. 2, the preferred embodiment of an integrated steering system 100 for use with a steering system is depicted. Integrated steering system 100 comprises an integrated housing 155 for housing several components including an integrated ignition switch system 105. System 105 comprises a lock cylinder 130 for receiving a key 135. Key 135 enables and disables lock cylinder 130. By enabling lock cylinder 130, an enable signal is transmitted from cylinder 130 to an ignition switch 140. In turn, an authentication signal is transmitted, through an electronic vehicle bus 150, from ignition switch 140 to a drive away prevention system within a microcomputer 120. Once the authentication signal is received by microcomputer 120, ignition switch 140 couples an electronic engine control system 145 with an ignition (not shown) to start an engine.

In contrast, a disable signal is transmitted from cylinder 130 to ignition switch 140 when the key 135 disables lock cylinder 130. At this point, an invalidation signal is transmitted from ignition switch 140 to the drive away prevention system within microcomputer 120. The ignition switch, as a result, decouples electronic engine control system 145 from the ignition to disable the engine. Thus, until key 135 is reinserted to enable lock cylinder 130, electronic engine control system 145 cannot couple the ignition with the engine, thereby preventing unauthorized usage. Similarly, as the presence of lock cylinder 130 is required for transmitting the authentication signal from ignition switch 140 to microcomputer 120, any attack on cylinder 130 by a thief would result in permanently disabling the coupling between ignition and engine and as a result ultimately preventing the engine from being started.

Within integrated housing 155, integrated steering system 100 also comprises a multifunction switch system 115.

Multifunction switch system 115 provides switch control to enable and disable independently at least two functional features including windshield wipers, windshield wiper speed, turn signals, dimmer, hazard lights, parking lights, and brights. To achieve this end, multifunction switch system 115 is coupled with microcomputer 120, which is preferably housed within system 115.

Moreover, system 100 comprises a rotational to non-rotational electrical conductor 110 for transmitting power and signal information of the steering system. In the preferred embodiment, rotational to non-rotational electrical conductor 110 comprises a cable or ribbon. Conductor 110 is mechanically coupled with integrated housing 155, while preferably coupled electrically with microcomputer 120 by means of electronic bus 150. In an alternate embodiment, a connector 125 is employed for electrically coupling conductor 110 with microcomputer 120. Connector 125 may be realized by means of a flat flexible cable, though other connector types may also be employed.

Figure 1:
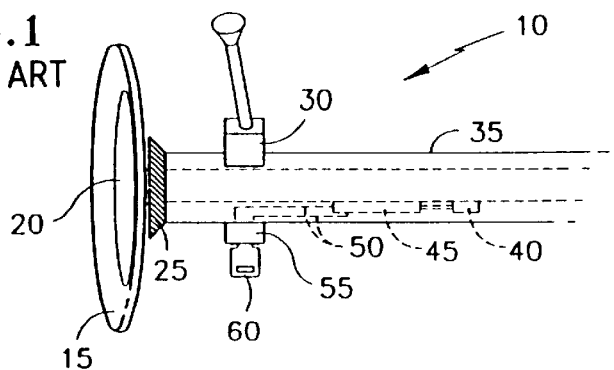
FIG. 1 illustrates a known configuration of a steering system.
Figure 3:
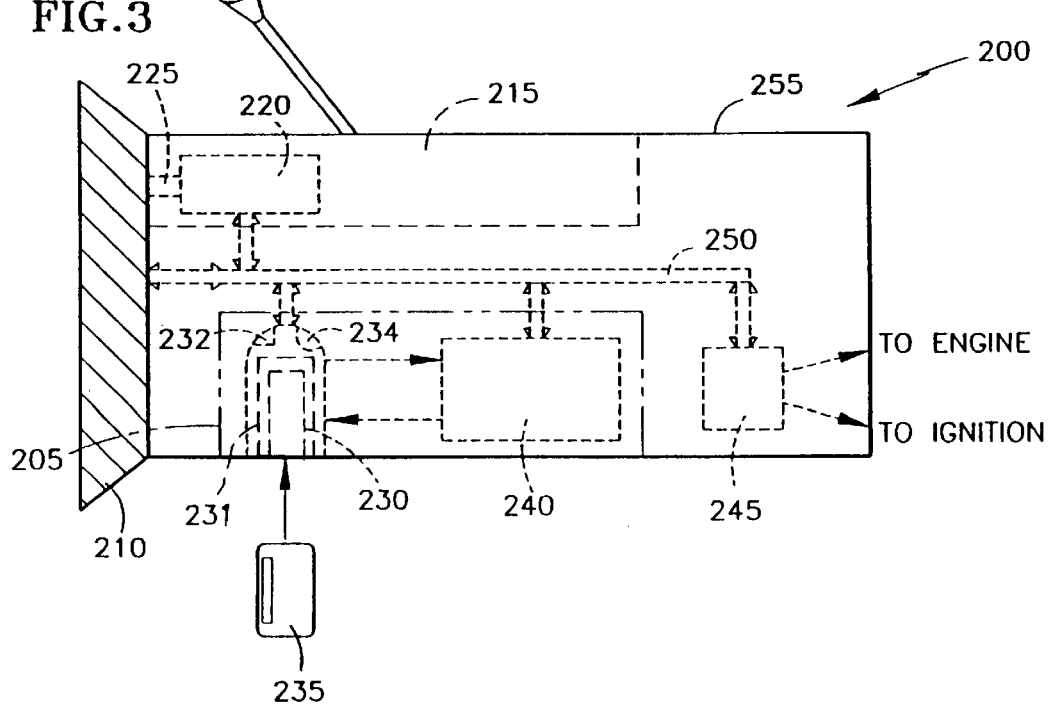
FIG. 3 illustrates a further embodiment of the present invention.

Referring to FIG. 3, a further embodiment of an integrated steering system 200 for use with a steering system is shown. Unlike the preferred embodiment of FIG. 1, integrated steering system 200 comprises a non-traditional integrated ignition switch system 205. Switch system 205 may be designed utilizing several schemes. To complete an optical realization, a card reader 230 for receiving and reading a card key 235. Card reader 230 and card key 235 card reader 230 comprises a light source 232 for generating a light beam which is reflected off of the reflective surfaces of card key 235 and detected by a light detector 234. The resultant key signal is transmitted by the light detector 234 to an ignition switch 240 where a comparison is done with a stored signal in memory (not shown). If stored signal matches the received key signal, an authentication signal is transmitted, through an electronic vehicle bus 250, from ignition switch 240 to a drive away prevention system within a microcomputer 220 such that card key 235 enables and disables reader 230. Once the authentication signal is received by microcomputer 220, ignition switch 240 couples an electronic engine control system 245 with an ignition (not shown) to start an engine.

In the event a magnetically based design is used, reader 230 comprises a magnetic head for reading the magnetic strip from card key 235. A resultant key signal is transmitted to an ignition switch 240 where a comparison is done with a stored signal in memory (not shown). If stored signal matches the received key signal, an authentication signal is transmitted, through electronic vehicle bus 250, from ignition switch 240 to the drive away prevention system within microcomputer 220 such that card key 235 enables and disables reader 230. Once the authentication signal is received by microcomputer 220, ignition switch 240 couples an electronic engine control system 245 with the ignition to start the engine.

Similarly, in a further embodiment of the present invention, reader 230 is realized by a remote keyless entry receiver, while key 235 comprises a remote keyless entry transmitter. Here, upon coupling receiver reader 230 with transmitter fob key 235, a resultant key signal is transmitted to the ignition switch 240 for comparing with a stored signal in memory. This arrangement may be realized by an inductive coil 231 on the receiver reader 230 which becomes electrically coupled with transmitter key 235 as a result of a mechanical coupling of both components. The mechanical coupling may be designed such that a male connector on the transmitter fob key 235 is fixedly adjoinable with a female connector on receiver reader 230. As a result of mating both male and female connectors, the inductive coil 231 is positioned around transmitter fob key 235 to form an electrical coupling with receiver reader 230.

Figure 4:
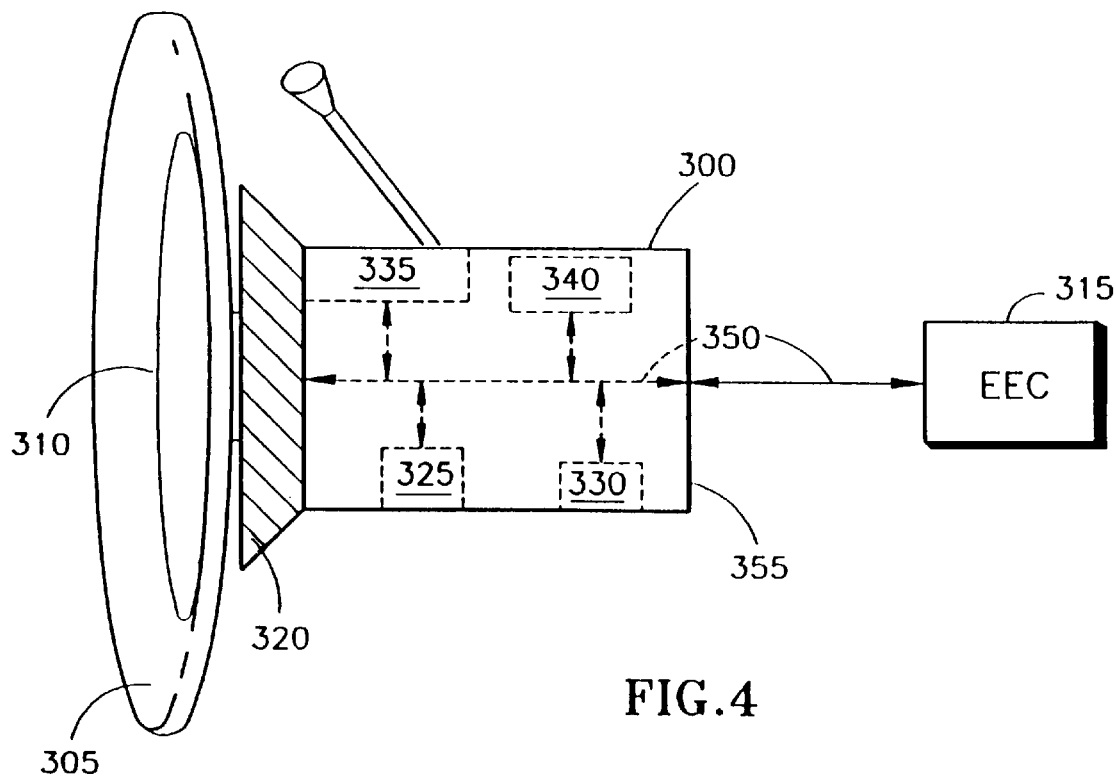
FIG. 4 illustrates still a further embodiment of the present invention.

Referring to FIG. 4, still a further embodiment of an integrated steering system 300 for use with a steering system is illustrated. Here, integrated steering system 300 comprises an integrated housing 355 for housing several components including an integrated ignition switch system 325. System 325 further comprises a lock cylinder for receiving a key, and for transmitting an enable signal from the cylinder to an ignition switch if when the key enables the lock cylinder. As a result of enabling the lock cylinder, as detailed hereinabove, an authentication signal is transmitted, through an electronic vehicle bus 350, from the ignition switch to a drive away prevention system within a microcomputer 330. Once the authentication signal is received by microcomputer 330, the ignition switch couples an electronic engine control system 315 with an ignition to start an engine.

Also coupled with electronic vehicle bus 350 is a multifunction switch system 335 Multifunction switch system 335 provides switch control to enable and disable independently at least two functional features including windshield wipers, windshield wiper speed, turn signals, dimmer, hazard lights, parking lights, and brights. To achieve this end, multifunction switch system 335 is coupled with microcomputer 330 through bus 350. In a further embodiment of the present invention, the switches associated with multifunction switch system 335 are optical based and microcomputer is an optical processor such that both interface by optical means.

In still yet a further embodiment, integrated steering system 300 additionally comprises a transmission select switch system 340. Transmission select switch system 340 enables the driver to electronically select, also referred to as "shift by wire" a transmission mode of operation. To realize this feature, transmission select switch system 340 is coupled to electronic bus 350. Once a transmission mode is selected, a select signal is transmitted along bus 350 to electronic engine control system 315 which in turn electronically enables the switching between selected transmission modes.

Moreover, integrated housing 355 is coupled with a steering wheel 305 having an airbag 310 through a rotational to non-rotational electrical conductor 320. Rotational to non-rotational electrical conductor 320 transmits power and signal information of steering wheel 305 which is coupled electrically with microcomputer 330 by means of electronic bus 350. By so doing, microcomputer 330 functionally processes the sensed positional rotational information.

It should be noted that in a further embodiment, rotational to non-rotational electrical conductor 320 is realized with an optical interface for transmitting power and signal information to steering wheel 305. The output of the optical interface is fed into microcomputer 330, or optimally, an optical processor, for processing the power and signal information as transmitted.

Figure 5:
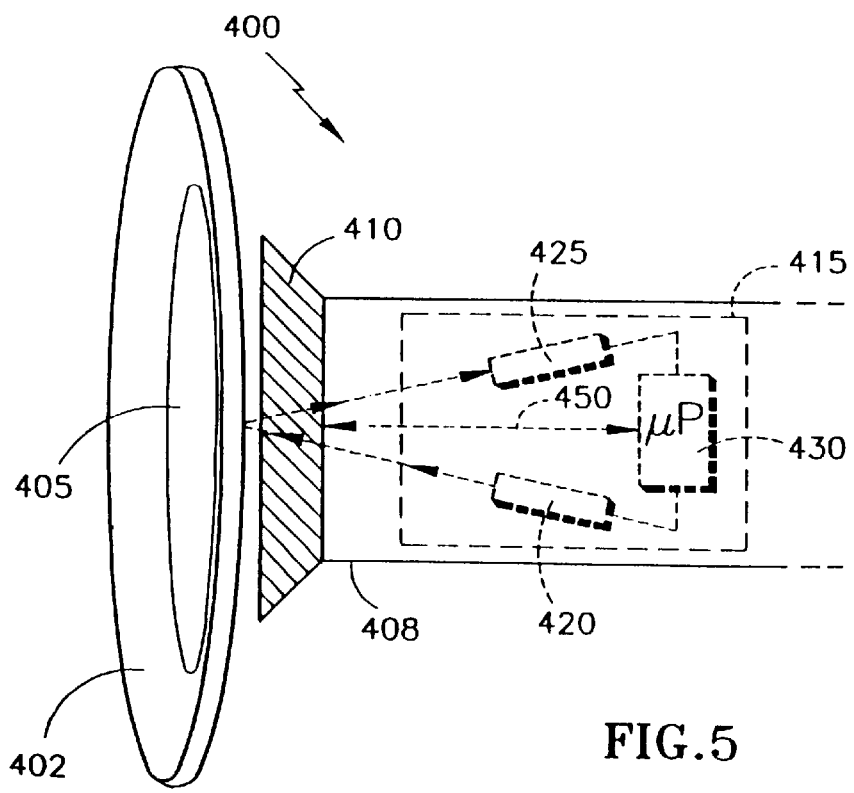
FIG. 5 illustrates yet still a further embodiment of the present invention.

Referring to FIG. 5, yet still a further embodiment of an integrated steering system 400 is depicted. System 400 comprises an integrated housing 408 which is coupled with a steering wheel 402 having an airbag 405 through a non-rotational to rotational electric conductor 410. Rotational to non-rotational electrical conductor 410 senses positional rotational information of steering wheel 402 which is coupled electrically with microcomputer 430 by means of electronic bus 450. As such, microcomputer 430 functionally processes the transmitted power and signal information of the steering wheel System 400 further comprises an optical steering sensor 415 for sensing steering changes of a steering wheel 402. Sensor 415 comprises a light source 420 for generating a light beam directed at a portion of the steering wheel having an optically coded pattern to enable a reflected light beam to be detected and received by a sensor 425. Information regarding direction, motion, and rate of change is detected by sensor 425 from the optically coded pattern of light reflected. In a further embodiment, steering sensor 415 is integrated with rotational to non-rotational electrical conductor 410.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. Thus, for example, it should be apparent to one of ordinary skill in the art that while the present invention is intended for vehicles, it is also suitable in conjunction with steering systems in other applications. Similarly, it should be apparent to one ordinary skill in the art while the steering system of the present invention has been detailed as the steering assembly including the steering wheel and the multifunction system, other formats including the multifunction system individually, for example, are available which would take fill advantage of the present invention. Moreover, while the present invention as detailed herein discloses a microcomputer, it should also be apparent to one of ordinary skill in the art that this implies a simple microprocessor or a more developed printed circuit board comprising various elements including a microprocessor or microcontroller. It is therefore contemplated that the appended claims will cover any such modifications or embodiments as fall within the true scope of the invention.

What is claimed is:

1. An integrated steering system for use with a directional control system and an electronic control system for controlling an engine and a first and a second feature, the integrated steering system comprising:
    a housing that is adapted to be supported on a steering column;
    an integrated ignition system supported within the housing and comprising:
        a lock having a key;
        an ignition; and
        a microcomputer for coupling said ignition with the electronic control system if said lock is enabled by said key, and for preventing said ignition from being coupled with the electronic control system if said lock is disabled by said key; and
    a multifunction switch supported within the housing, said multifunction switch coupled with said microcomputer, for enabling and disabling the first and second features such that said microcomputer controls the first and second features.

2. The invention of claim 1, further comprising:
    a rotational to non-rotational electrical conductor for transmitting power and signal information of the directional control system; and
    a connector for coupling said microcontroller with said rotational to non-rotational electrical conductor.

3. The invention of claim 2, wherein said rotational to non-rotational electrical conductor comprises a ribbon cable.

4. The invention of claim 2, wherein said connector comprises flat flexible cable.

5. The invention of claim 1, wherein said key comprises a magnetic card and said lock comprises a reader for reading and authenticating said magnetic card.

6. The invention of claim 1, wherein said key comprises a remote keyless entry transmitter and said lock comprises a remote keyless entry receiver.

7. The invention of claim 1, wherein said lock comprises an inductive coil which is positioned around a key receiving structure such that said inductive coil is coupled with said key.

8. The invention of claim 7, wherein said key comprises at least one of a remote keyless entry fob and a magnetic strip, and said inductive coil inductively receives an authentication signal from said at least one of a remote keyless entry fob and a magnetic strip and transmits said authentication signal to said microcomputer.

9. The invention of claim 1, wherein at least one of the first feature and second features comprise at least one windshield wiper, windshield wiper speed, turn signal, dimmer, hazard lights, parking lights, driving lights, and headlight high beams.

10. The invention of claim 1, further comprising a vehicle bus for coupling said multifunction switch and said ignition with the electronic control system.

11. The invention of claim 1, wherein said key comprises reflective characteristics, said microcomputer comprises an optical device for reading said reflective characteristics of said key.

12. The invention of claim 1, further comprising:
    an optical interface for transmitting power and signal information of the directional control system; and
    said microcomputer comprises an optical processor for processing said transmitted power and signal information.

13. The invention of claim 1, further comprising a steering sensor for sensing steering changes of the directional control system.

14. The invention of claim 13, wherein said steering sensor comprises:
    a light source for directing a light beam at the directional control system; and
    a sensor for sensing at least one of directional, motion and rate of change information from said light beam reflecting off of the directional control system.

15. The system of claim 1, wherein the multifunction switch is responsive to manual actuation.

16. The system of claim 1, further comprising a switch stalk having at least a portion that is external to the housing and wherein the multifunction switch is responsive to manual operation of the switch stalk to individually control the first and second feature, respectively.

17. An integrated steering system for use with a steering system and an electronic control system for controlling an engine and a first and a second feature, the integrated steering system comprising:
    an integrated housing adapted to be supported by a steering column
    an integrated ignition system supported within the housing comprising:
        a lock having a key;
        an ignition; and
        a microcomputer for coupling said ignition with the electronic control system if said lock is enabled by said key, and for preventing said ignition from being coupled with the electronic control system if said lock is disabled by said key;

a multifunction switch supported within the housing and coupled with the electronic control system, for enabling and disabling the first and second features such that said electronic control system controls the first and second features; and a rotational to non-rotational electrical conductor for transmitting power and signal information of the steering system to said microcomputer; and a connector for coupling said microcomputer with said rotational to non-rotational electrical conductor and with said multifunction switch.

18. The invention of claim 17, wherein said key comprises at least one of a magnetic card and remote keyless entry transmitter, and said lock comprises at least one of a reader for reading and authenticating said magnetic card and a remote keyless entry receiver.

19. The invention of claim 18, wherein said lock comprises an inductive coil which is positioned around a key receiving structure such that said inductive coil is coupled with said key, and said inductive coil inductively receives an authentication signal from said at least one of a remote keyless entry fob and a magnetic strip and transmits said authentication signal to said microcomputer.

20. The invention of claim 17, wherein at least one of the first feature and second features comprise at least one of a windshield wiper, windshield wiper speed, turn signal, dimmer, hazard lights, parking lights, driving lights, and headlight high beams.

21. The invention of claim 17, wherein said key comprises reflective characteristics, said microcomputer comprises an optical device for reading said reflective characteristics of said key.

22. The invention of claim 17, further comprising:

an optical interface for transmitting power and signal information of the directional control system; and said microcomputer comprises an optical processor for processing said transmitted power and signal information, said optical processor optically being coupled with said optical interface.

23. The invention of claim 17, further comprising a steering sensor for sensing steering changes of the directional control system, said steering sensor being integrated with said rotational to non-rotational electrical conductor, said steering sensor comprises:

a light source for directing a light beam at the directional control system; and a sensor for sensing at least one of directional, motion and rate of change information from said light beam reflecting off of the directional control system.

24. The system of claim 17, further comprising a switch stalk having at least a portion that is external to the housing and wherein the multifunction switch is responsive to manual operation of the switch stalk.

25. The system of claim 24, wherein the multifunction switch individually controls the first and second feature, respectively, responsive to manual operation of the switch stalk.

26. An integrated steering system for use with a steering system and an electronic control system for controlling an engine and a first and a second feature, the first feature and second feature comprising at least one of a windshield wiper, windshield wiper speed, turn signal, dimmer, hazard lights, parking lights, and headlight high beams, the integrated steering system comprising:

an integrated ignition system supported within a steering column comprising:

a lock having a key;

an ignition; and a microcomputer for coupling said ignition with the electronic control system if said lock is enabled by said key, and for preventing said ignition system from being coupled with the electronic control system if said lock is disabled by said key;

a multifunction switch integrated with said integrated ignition system within the steering column, said multifunction switch being responsive to manual actuation of a switch stalk supported by the steering column, said multifunction switch being coupled with the electronic control system, for enabling and disabling the first and second features, respectively, such that said electronic control system controls the first and second features in response to said multifunction switch; and a clockspring for sensing positional rotational information of the steering system such that said microcomputer translates said sensed positional rotational information to linear position information;

a connector for coupling said microcomputer with said clockspring and with said multifunction switch.

27. The system of claim 26, further comprising a housing adapted to be supported within a steering column and wherein the integrated ignition system and the multifunction switch are supported within the housing.

28. The invention of claim 26, further comprising a steering sensor for sensing steering changes of the directional control system, said steering sensor being integrated with said clockspring, said steering sensor comprises:

a light source for directing a light beam at the directional control system; and a sensor for sensing at least one of directional, motion and rate of change information from said light beam reflecting off of the directional control system.

* * * * *